April 25, 1939.　　　N. C. NIELSEN　　　2,155,994
LOCK FOR BICYCLES
Filed April 8, 1937　　　2 Sheets-Sheet 2

Inventor:
Niels Christian Nielsen
by George C. Heinrich
Attorney.

Patented Apr. 25, 1939

2,155,994

UNITED STATES PATENT OFFICE 2,155,994

LOCK FOR BICYCLES

Niels Christian Nielsen, Copenhagen, Denmark

Application April 8, 1937, Serial No. 135,613
In Denmark April 8, 1936

2 Claims. (Cl. 70—226)

The present invention relates to improvements in locks for bicycles. The lock according to the invention is intended for application to the one end of the hub of a bicycle wheeel, for instance a freewheel hub, around which it fits tightly, and when locked cannot be disengaged from its locking engagement by being struck with, for instance, a hammer, or by any portion of the lock being cut or broken apart, such as is the case with the commonly known locks for bicycles. In case the lock according to the invention is subjected to any such violence the result will be that it is blocked, and it can then only be unlocked by the removal of the entire wheel with its hub from the frame of the bicycle. Furthermore the lock may be so arranged that its disengagement with the wheel is prevented by any other means than the proper key.

In its construction heed is taken to form the lock in such a manner that it may be applied to any known type of wheel hub without necessitating alterations or any essential alteration. The hub lock is likewise not so prominent that it disfigures the cycle to which it is applied.

The lock according to the present invention is mainly characterized by the combination with the outer end of the hub of a bicycle wheel of a cylindrical housing containing locking means for providing locking engagement between the housing and the hub, which locking means are actuated for releasing the said engagement by means of a key inserted within a keyhole formed in the housing.

Two manners of constructing the lock according to the invention are illustrated in the accompanying drawings, in which—

Figure 1:
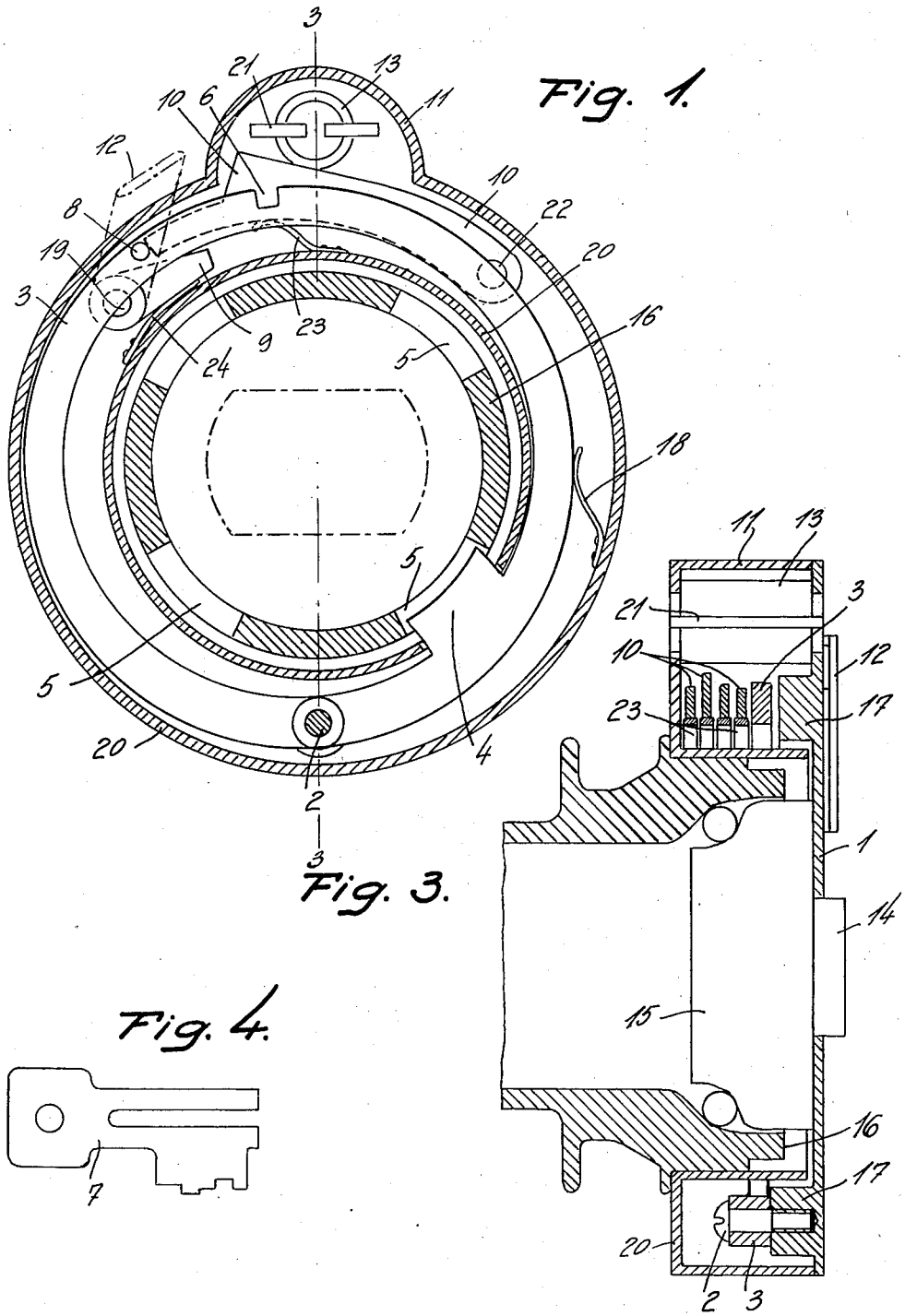
Figure 2:
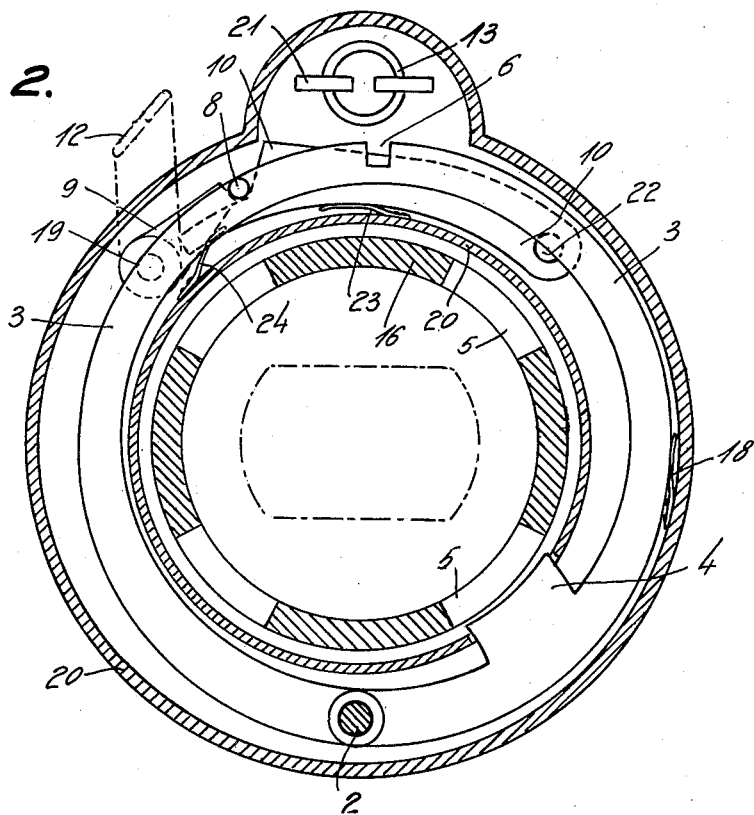

Fig. 1 is a sectional view of the lock applied to the hub of a bicycle, and in which the locking members are shown in their locked position, Fig. 2 the same with the locking members in their unlocked position, Fig. 3 a sectional view of Fig. 1 on line 3—3, Fig. 4 a side elevation of a key for use in connection with the lock illustrated in Figs. 1-3.

Referring to Figs. 1-4 of the drawings I indicates a circular cover plate provided in the centre with a substantially rectangular hole that engages and holds a correspondingly formed angular projection 14 extending outwardly from the end of the cone 15 inside the hub 16 of a bicycle wheel. Embracing the hub 16 there is arranged a double-walled cylinder 20. The space between the two walls of this cylinder is closed by the plate 1. The cylinder and the cover plate form thus a housing, which in the following will be termed as such. The cover plate 1 has within the housing an annular flange 17 to which is attached a pivot pin 2 for a ring member 3, which member by means of a spring 18 is pressed in the position illustrated in Fig. 1. The ring 3 is provided with a projection 4 extending radially through a slot or aperture in the inner wall of the housing to engage one of a number of slots 5 in the hub 16. Diametrically opposite the pivot pin 2 the ring has an incision 6 or the like for engaging the bit of a key 7, Fig. 4, and at a short distance from this incision the ring carries an abutment pin 8.

To a pivot pin 19 projecting from the plate 1 or the flange 17 there is pivoted a finger catch 12 extending outside the housing, and an arm 9 rigidly connected with the finger catch and extending within the housing. Within an extension 11 formed in the housing there is disposed a key barrel 13 provided with incisions 21 that correspond with similar incisions in the plate 1, said incisions serving as a key hole for the key 7, which upon insertion may be turned to first press the locking members 10 pivotally mounted on a pin 22 within the housing downwardly against the actuation of springs 23 for the purpose of releasing the abutment pin 8 from its engagement with the ends of the locking members 10, and thereupon to engage the incision 6, and subsequently to displace against the actuation of the spring 18 the ring 3 to the position illustrated in Fig. 2. By this movement the arm 9 is raised by the action of the spring 24 within the housing to the position shown in Fig. 2, where the end of the arm abuts the abutment pin 8, and the projection 4 is drawn out of engagement with the slot 5 and the lock is unlocked. The key may be withdrawn when it is turned through 180 degrees.

When the lock device is again to be locked the finger catch 12 is pressed inwardly to turn the arm 9 out of engagement with the abutment pin 8. The ring 3 is hereby released and by the action of the spring 18 is turned on its pivot pin 2 until the projection 4 bears against the hub 16. A turning of the wheel will cause the projection 4 to enter the first slot 5 that comes opposite it, and the wheel is thus locked against further rotation.

I declare that what I claim is:

1. In a lock for bicycle wheels, the combination with the outer end of the wheel hub, of a cylindrical housing encircling the outer end portion of the hub, an annular locking member pivotally disposed within the housing concentrically with the hub, a number of peripherally disposed slots in the said portion of the hub, an aperture in the inner wall of the housing, a locking member on the said annular member projecting through the said aperture for engagement with one of the peripheral slots, spring means for actuating the annular member to maintain the engagement of the locking member with the hub, means for locking the annular member in its engagement with the hub, an extension formed in the housing, a key barrel in the extension adapted to receive a key for releasing the locking engagement between the annular member and the hub, and means for holding the annular member in its unlocked position.

2. In a lock for bicycle wheels, the combination with the outer end of the wheel hub, of a cylindrical housing encircling the outer end portion of the hub, a ring disposed within the housing concentrically with the hub, a pivot pin within the housing for the said ring, spring actuated means for providing locking engagement between the ring and the hub, an extension formed in the housing, locking members pivoted at one end within the housing and extending partly within the extension, an abutment pin attached to the ring for abutment with the end of the said locking members when the lock device is in locked position, springs pressing the locking members outwardly, a spring actuated arm disposed and pivoted within the housing for engagement by its one end with the abutment pin when the lock is in its unlocked position, a finger catch rigidly attached to the arm and projecting outside the housing, and a key barrel in the wall of the extension of the housing adapted to receive a key for actuating the ring and the locking members for unlocking the lock device.

NIELS CHRISTIAN NIELSEN.